(12) United States Patent
Lardinelli (10) Patent No.: US 10,750,225 B2
(45) Date of Patent: Aug. 18, 2020

(54) METHOD AND SYSTEM FOR TRANSMITTING ON DEMAND VIDEOS OF FITNESS SESSIONS ON FIXED AND/OR MOBILE ELECTRONIC DEVICES

(71) Applicant: MS45 SRL, Viareggio (LU) (IT)

(72) Inventor: Vincenzo Lardinelli, Viareggion (IT)

(73) Assignee: MS45 SRL, Viareggio (LU) (IT)

( * ) Notice: Subject to any disclaimer, the term of this patent is extended or adjusted under 35 U.S.C. 154(b) by 0 days.

(21) Appl. No.: 15/570,192

(22) PCT Filed: Apr. 27, 2016

(86) PCT No.: PCT/IT2016/000102
§ 371 (c)(1),
(2) Date: Oct. 27, 2017

(87) PCT Pub. No.: WO2016/174690
PCT Pub. Date: Nov. 3, 2016

(65) Prior Publication Data
US 2018/0139486 A1    May 17, 2018

(30) Foreign Application Priority Data

Apr. 29, 2015    (IT) .............................. LU2015A0005

(51) Int. Cl.
*H04N 1/327*    (2006.01)
*H04N 21/2743*    (2011.01)
(Continued)

(52) U.S. Cl.
CPC ....... *H04N 21/2743* (2013.01); *H04N 21/234* (2013.01); *H04N 21/23439* (2013.01);
(Continued)

(58) Field of Classification Search
CPC ............ H04N 21/2743; H04N 21/234; H04N 21/23439; H04N 21/47202; H04N 21/643;
(Continued)

(56) References Cited

U.S. PATENT DOCUMENTS 2,764,629 A * 9/1956 Goldmark ................ H04N 9/11
348/101
3,104,280 A * 9/1963 Akrell .................... H04N 7/163
380/238
(Continued)

FOREIGN PATENT DOCUMENTS

GB    2 483 378 A    3/2012

OTHER PUBLICATIONS

Nicola Doring: "Professionalisierung and Kommerzialisierung auf YouTube", Merz. Medien + Erziehung, Jan. 1, 2014 (Jan. 1, 2014), Munchen, XP055228138, Retrieved from the Internet.
(Continued)

*Primary Examiner* — Alfonso Castro
(74) *Attorney, Agent, or Firm* — Young & Thompson (57) ABSTRACT

A method and a system of electronic devices that cooperate with one another to implement this method enable the transmission on demand of videos of fitness sessions on fixed and/or mobile electronic devices by: at least one video camera; a device for acquisition, encoding and transmission of video, connectable to the at least one video camera, provided with Internet connection; a first server, associated with the at least one video camera; a streaming platform, residing and executed on the first server; a second server, associated with the first server; a web application, residing and executed on the second server. The first server cooperates with the video camera to manage the videos received by the Internet connection. The second server cooperates with
(Continued)

the streaming platform of the first server, enabling transmission on demand of the videos toward Internet-connected fixed and/or mobile electronic devices.

11 Claims, 7 Drawing Sheets

(51) Int. Cl.
  *H04N 21/472* (2011.01)
  *H04N 21/2343* (2011.01)
  *H04N 21/643* (2011.01)
  *H04N 21/234* (2011.01)
  *H04N 7/15* (2006.01)
  *H04N 7/14* (2006.01)

(52) U.S. Cl.
  CPC ..... *H04N 21/47202* (2013.01); *H04N 21/643* (2013.01); *H04N 21/64322* (2013.01); *H04N 7/15* (2013.01); *H04N 2007/145* (2013.01)

(58) Field of Classification Search
  CPC ............... H04N 21/64322; H04N 7/15; H04N 2007/145
  USPC ........................................................ 725/109
  See application file for complete search history.

(56) References Cited

U.S. PATENT DOCUMENTS

| | | | | |
|---|---|---|---|---|
| 3,192,313 | A * | 6/1965 | Brownstein | H04N 7/164 |
| | | | | 194/239 |
| 5,375,068 | A * | 12/1994 | Palmer | H04N 7/147 |
| | | | | 348/E7.081 |
| 5,481,542 | A * | 1/1996 | Logston | H04J 3/1694 |
| | | | | 348/E7.056 |
| 5,537,141 | A * | 7/1996 | Harper | G09B 5/065 |
| | | | | 348/E7.017 |
| 6,607,483 | B1 * | 8/2003 | Holland | A61B 5/02 |
| | | | | 128/921 |
| 8,479,242 | B1 * | 7/2013 | Chen | H04N 21/23103 |
| | | | | 725/93 |
| 8,850,490 | B1 * | 9/2014 | Thomas | H04N 21/47211 |
| | | | | 725/109 |
| 9,560,400 | B2 * | 1/2017 | Thomas | H04N 21/47211 |
| 10,003,840 | B2 * | 6/2018 | Richman | H04N 21/2668 |
| 2005/0192156 | A1 * | 9/2005 | Daikeler | A63B 24/00 |
| | | | | 482/9 |
| 2007/0136093 | A1 * | 6/2007 | Rankin | G06F 19/3481 |
| | | | | 705/2 |
| 2007/0204011 | A1 * | 8/2007 | Shaver | H04N 21/4782 |
| | | | | 709/219 |
| 2008/0195664 | A1 * | 8/2008 | Maharajh | G06Q 10/10 |
| 2009/0047644 | A1 * | 2/2009 | Mensah | G09B 5/06 |
| | | | | 434/247 |
| 2009/0061764 | A1 * | 3/2009 | Lockhart | H04L 67/02 |
| | | | | 455/3.06 |
| 2010/0195974 | A1 * | 8/2010 | Zheng | H04N 5/76 |
| | | | | 386/343 |
| 2011/0321072 | A1 * | 12/2011 | Patterson | H04N 21/44222 |
| | | | | 725/5 |
| 2014/0137170 | A1 * | 5/2014 | Molinelli | H04N 21/26258 |
| | | | | 725/93 |
| 2015/0289023 | A1 * | 10/2015 | Richman | H04N 21/2393 |
| | | | | 725/32 |
| 2016/0042651 | A1 * | 2/2016 | Joao | G09B 5/06 |
| | | | | 434/309 |
| 2016/0284016 | A1 * | 9/2016 | Caton | G06Q 30/0641 |

OTHER PUBLICATIONS

Ronald Alan Berk: "DF] Multimedia teaching with video clips: TV, movies, YouTube, and mtvU in the college classroom", Jan. 31, 2009 (Jan. 31, 2009), pp. 1-20, XP055228145, The Johns Hopkins University, International Journal of Technology in teaching and Learning, 5(1)m 1-21.

International Search Report, dated Aug. 19, 2016, from corresponding PCT/IT2016/000102 application.

\* cited by examiner

METHOD AND SYSTEM FOR TRANSMITTING ON DEMAND VIDEOS OF FITNESS SESSIONS ON FIXED AND/OR MOBILE ELECTRONIC DEVICES

The invention relates to the field of fitness centres and gyms in general.

More in detail, the invention relates to a method and a system of electronic devices that cooperate with one another to implement this method, adapted to enable the transmission on demand of videos of fitness sessions on fixed and/or mobile electronic devices.

As is known, regular clients of fitness centres or gyms in general tend prevalently to perform exercises proposed by individual trainers (also personal trainers) for whom they have a particular professional admiration or with whom they share specific objectives and/or training systems.

Being unable to physically attend the fitness centre or gym to which the user belongs to participate in fitness sessions held by their favourite trainer, and perform the exercises proposed live, can therefore represent a serious drawback.

Another serious drawback may be represented by being unable to participate in fitness exercises, and/or events related to fitness, and/or fitness training sessions, organized in different places to the fitness centres or gyms to which the user belongs.

The object of the present invention is to propose a method and to produce a system that makes this method effective and that allows the aforesaid drawbacks to be overcome, enabling the transmission on demand of videos of fitness sessions (exercises, entertainment proposals, events, training lessons, etc.) on fixed and/or mobile electronic devices, in streaming in live mode or recorded; wherein the term video refers broadly to information streams composed of moving images and sound. GB2483378 describes a method for transmitting videos on demand, comprising in succession the steps of:
  displaying a link to a video in a web browser of a device, the link corresponding to a URL of the Internet;
  accessing a web server according to the URL of the link;
  interrogating the device by the web server to determine the type of the device; and
  re-directing the device to a streaming device to stream a version of the video that is suitable for the determined type of the device to the device.

The object of the present invention is achieved with a method for transmitting on demand videos of fitness sessions on fixed and/or mobile electronic devices, characterized in that it comprises the steps of:
  providing at least one video camera;
  providing a device for acquisition, encoding and transmission of videos, connectable to said at least one video camera, provided with Internet connection;
  making a video recording of fitness sessions, by means of said at least one video camera;
  transmitting, by means of said Internet connection, the videos recorded by said at least one video camera;
  providing a first server adapted to cooperate with said at least one video camera to manage the videos received by means of said Internet connection associated with said device;
  providing a streaming platform, residing and executed on said first server, adapted to cooperate with fixed and/or mobile electronic devices provided with Internet connection;
  providing a second server adapted to cooperate with said first server and with fixed and/or mobile electronic devices provided with Internet connection;
  providing a web application, residing and executed on said second server, accessible from fixed and/or mobile electronic devices provided with Internet connection;
  accessing said second server, by means of the Internet connection provided on said fixed and/or mobile electronic devices, to send, by means of said web application, requests for viewing videos managed by said first server;
  transmitting said viewing requests to the streaming platform of said first server, by means of said second server;
  transmitting the videos corresponding to said viewing requests toward said fixed and/or mobile electronic devices, by means of the streaming platform residing and executed on said first server.

The subject-matter of the invention also relates to a system for transmitting on demand, in streaming in live or recorded mode, videos of fitness sessions on fixed and/or mobile electronic devices, characterized in that it comprises:
  at least one video camera;
  a device for acquisition, encoding and transmission of videos, connectable to said at least one video camera, provided with Internet connection;
  a first server, associated with said at least one video camera;
  a streaming platform, residing and executed on said first server, adapted to cooperate with fixed and/or mobile electronic devices provided with Internet connection;
  a second server, associated with said first server;
  a web application, residing and executed on said second server, accessible from fixed and/or mobile electronic devices, provided with Internet connection;
  wherein said first server cooperates with said at least one video camera to manage the videos received by means of said Internet connection associated with said device, and wherein said second server cooperates with said streaming platform of said first server to enable the transmission on-demand of said videos toward fixed and/or mobile electronic devices connected to it by means of the Internet connections provided on the same.

Further characteristics of the method and of the system for transmitting on demand videos of fitness sessions on fixed and/or mobile electronic devices are contained in the dependent claims.

The method and the system for transmitting on demand videos of fitness sessions on fixed and/or mobile electronic devices, according to the invention, produce numerous and important advantages, and make it possible to:
  satisfy the increasing need for psychophysical rebalancing without the need to physically attend the fitness centres usually frequented or gyms in general;
  virtualize the training and/or entertainment proposals normally provided on-site by fitness centres or gyms in general and therefore to perform the preferred physical activity in the domestic or working environment, and to perform the fitness exercises proposed by the trainers of fitness centres and/or gyms to which the user belongs without having to be physically present in the place in which the sessions are held, and to select the fitness exercises proposed by particularly well-known trainers of fitness centres and/or gyms, located anywhere in the world;
  watch and participate in, from the home or place of work, or even in fitness centres or gyms to which the user belongs, fitness events organized in any part of the world, in this way feeling involved, even if only virtually;

combining the demand of users with the offer of fitness centres or gyms in general, and expanding the services normally offered by said fitness centres or gyms in general, providing an alternative to, but not a replacement for, frequenting the same;

promoting training, and/or entertainment, and/or teaching proposals, provided by fitness centres or gyms in general, or by individual trainers, and events organized by the same.

Further characteristics and advantages of the invention will be more evident from the detailed description set forth below, with the aid of the drawings, which show a preferred implementation thereof, illustrated by way of non-limiting example, wherein.

Figure 1:
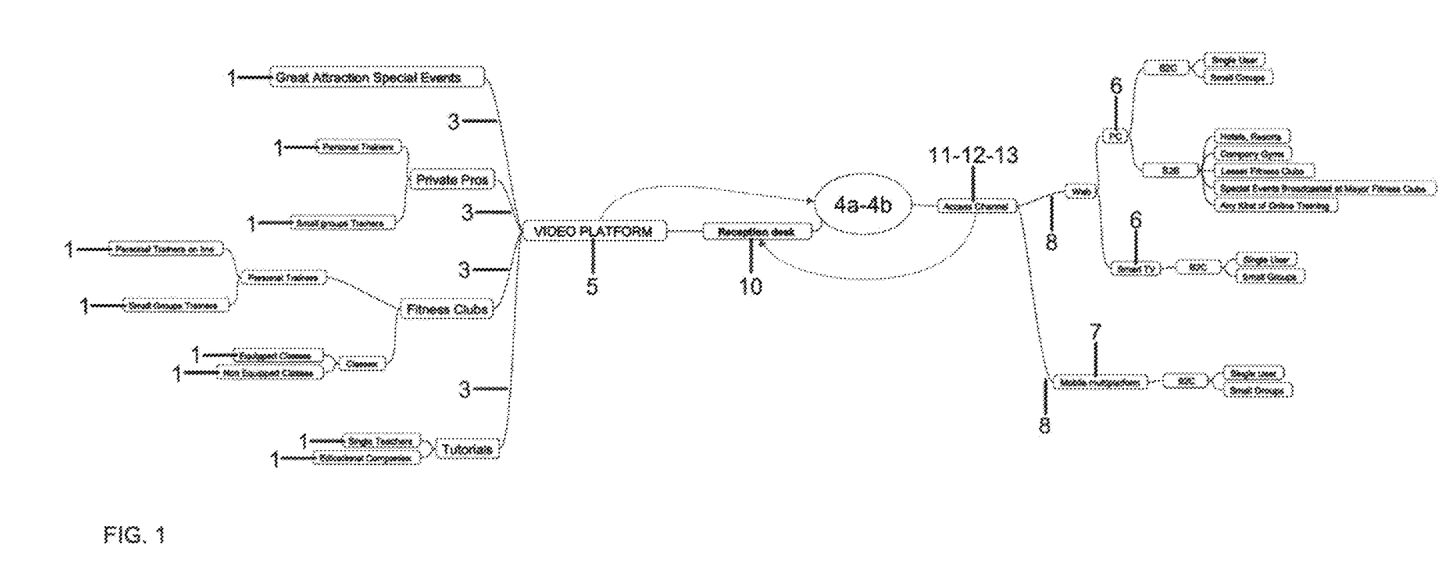
FIG. 1 schematically represents the operating principle of a system for transmitting on demand videos of fitness sessions on fixed and/or mobile electronic devices, according to the invention.
Figure 2:
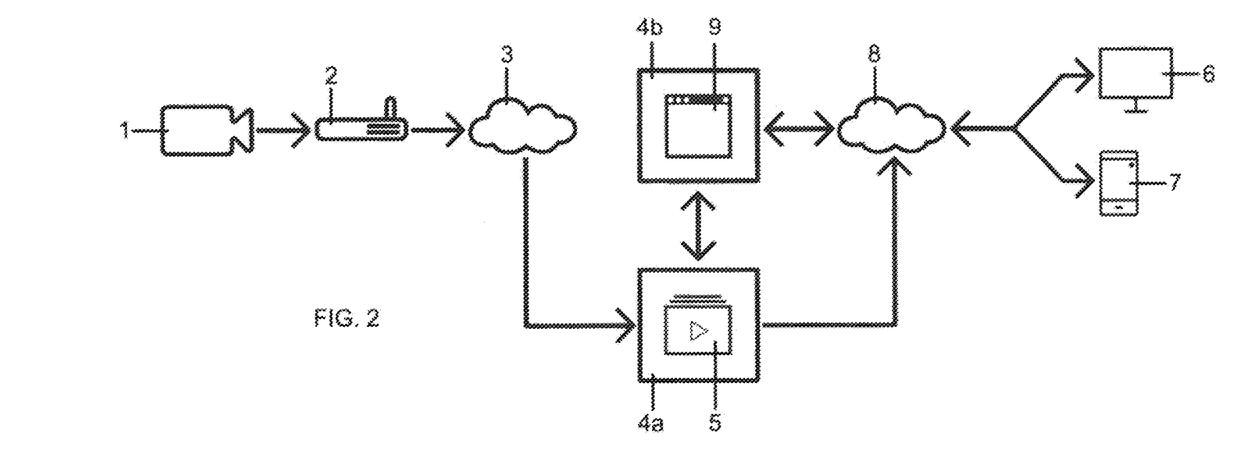
FIG. 2 schematically represents the structure and the general components of said system according to a preferred embodiment.
Figure 3:
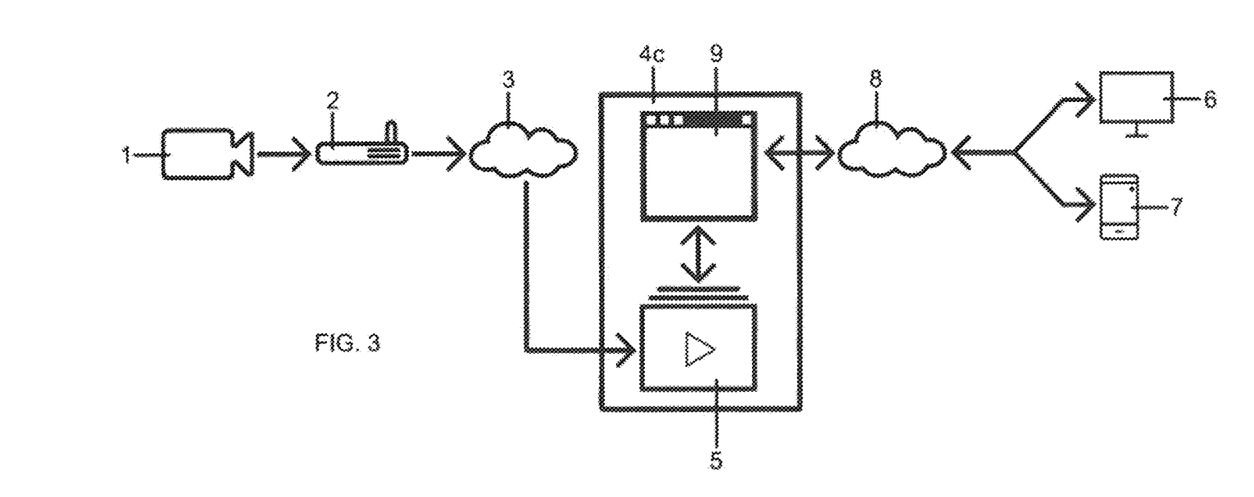
FIG. 3 schematically represents the structure and the general components of a possible variant of embodiment of said system where the audio-video streaming platform and the web application reside on the same server.
Figure 4:
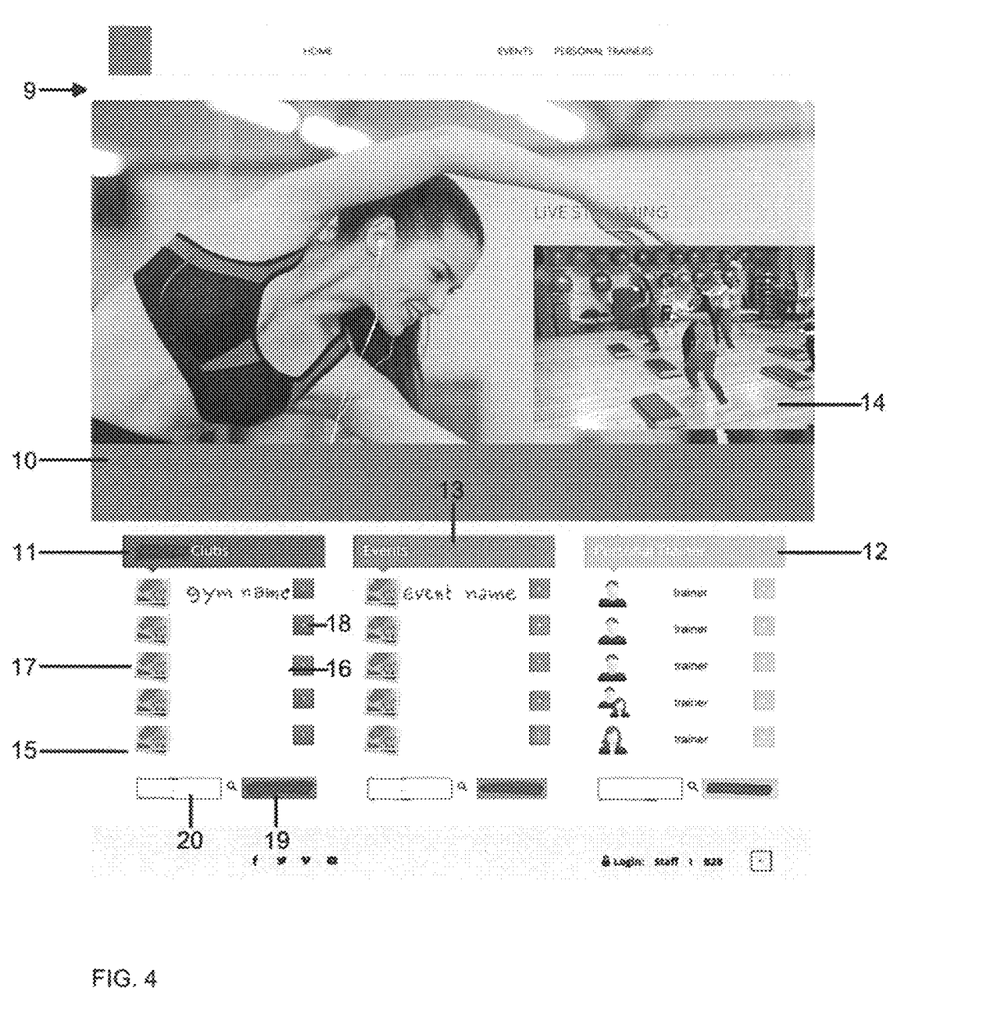
FIGS. 4-5-6-7-8 show some screenshots of a web application associated with said system.
Figure 5:
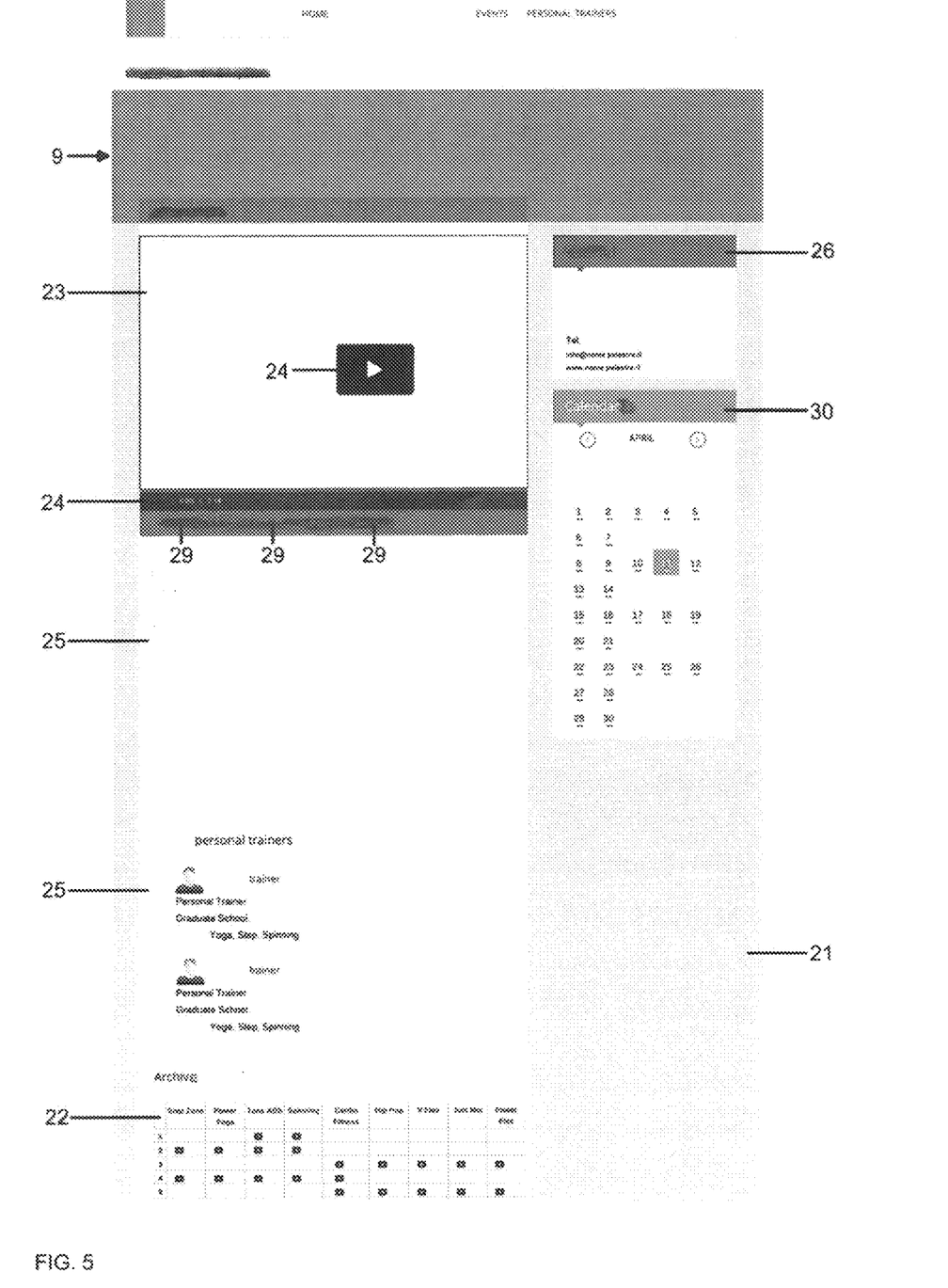
Figure 6:
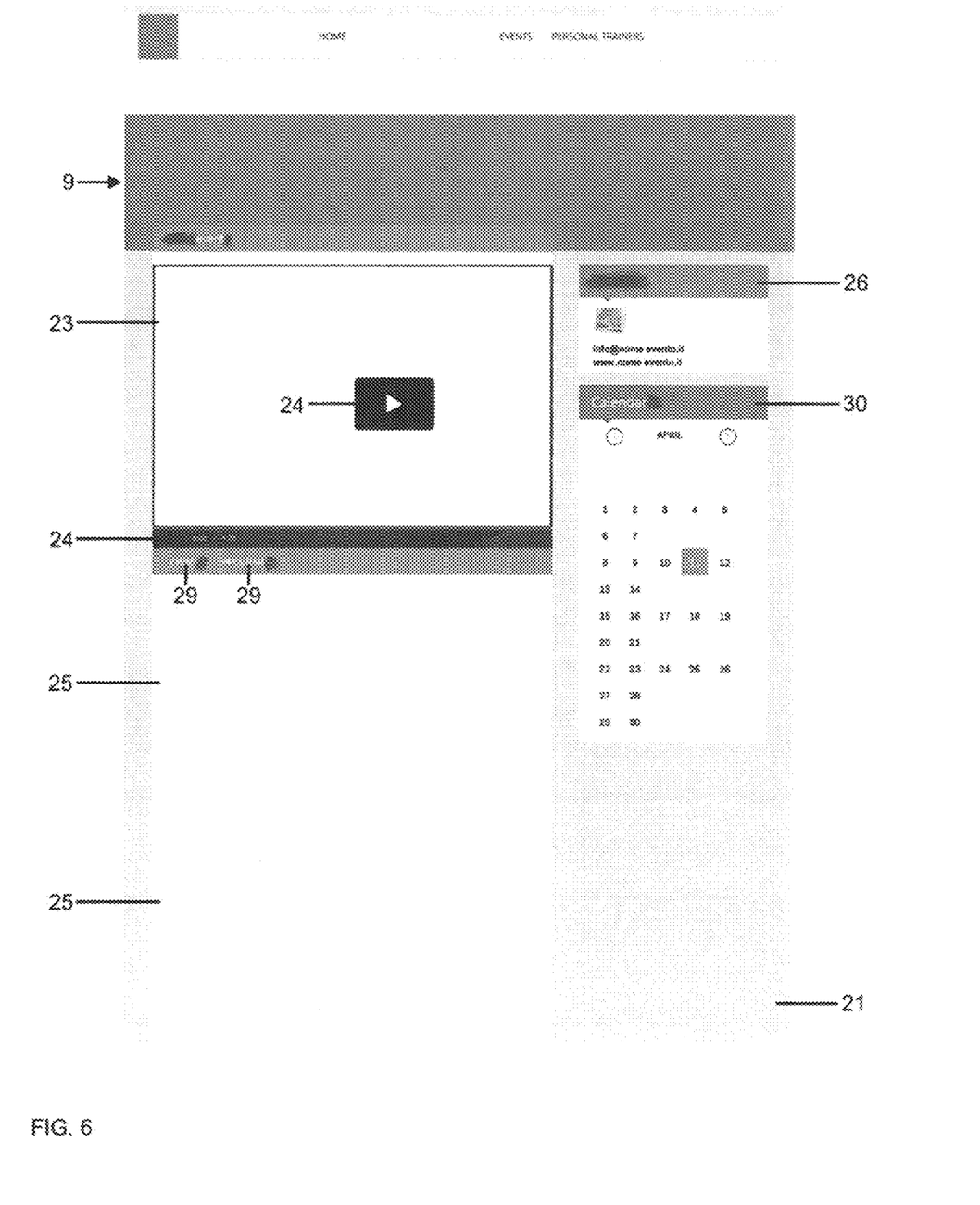
Figure 7:
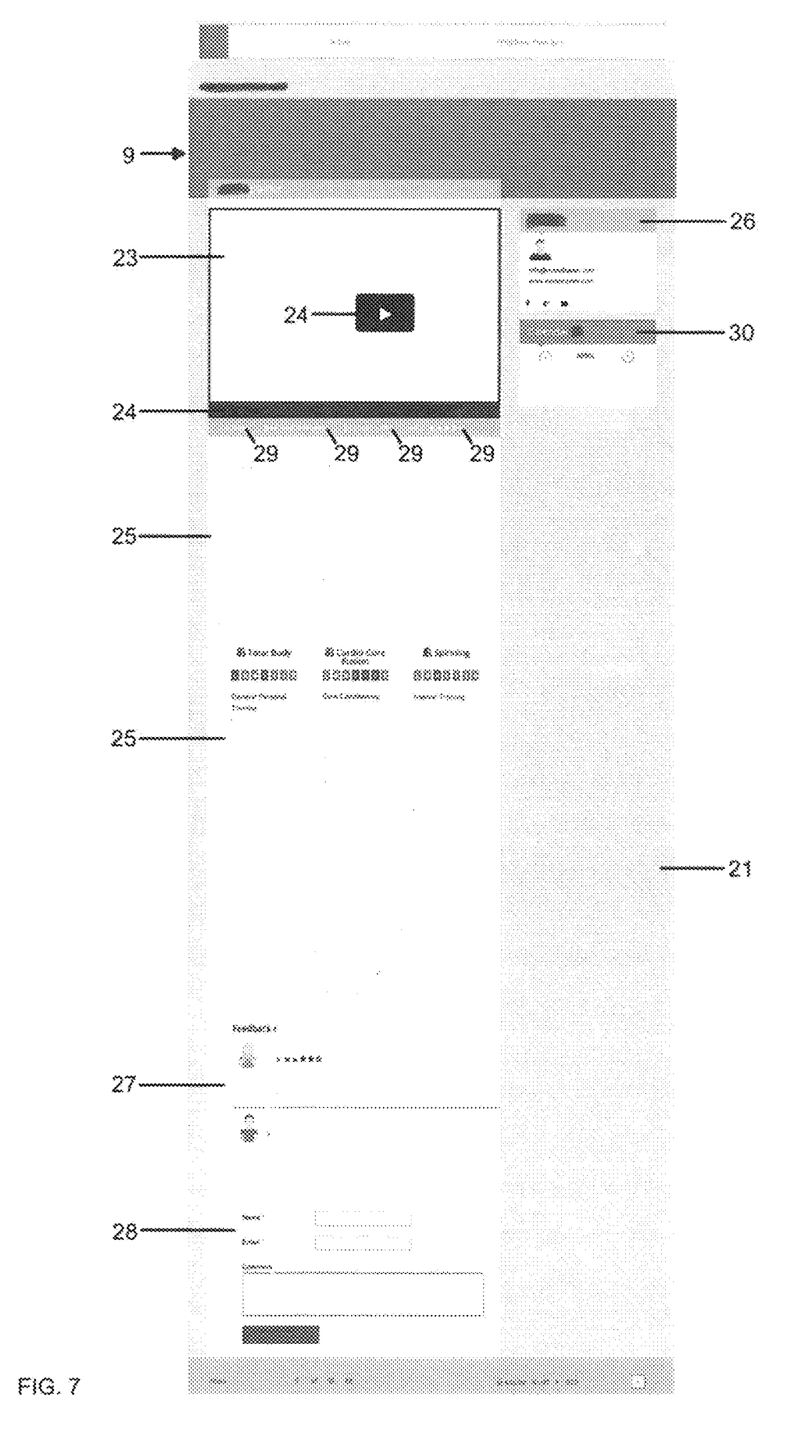

With reference to the details of FIGS. 1-3, a system for transmitting on demand videos of fitness sessions on fixed and/or mobile electronic devices, according to the invention, substantially comprises:

at least one video camera 1, for recording videos of fitness sessions;

a device 2 for acquisition, encoding and transmission of videos, provided with Internet connection 3, connectable to said at least one video camera 1;

a first server 4a, adapted to manage the videos received by means of the Internet connection 3 associated with said device 2;

a streaming platform 5, residing and executed on said first server 4a, adapted to cooperate with fixed 6 (smart TVs, desktop PCs, etc.) and/or mobile 7 (smartphones, tablets, notebook PCs, etc.) electronic devices provided with Internet connection 8, for transmitting on demand on said devices 6, 7 the videos managed by said first server 4a;

a second server 4b, adapted to cooperate with said first server 4a and with fixed 6 (smart TVs, desktop PCs, etc.) and/or mobile 7 (smartphones, tablets, notebook PCs, etc.) electronic devices provided with Internet connection 8, to receive from said devices 6 and 7, requests to display the videos managed by said first server 4a;

a web application 9 (website or portal), residing and executed on said second server 4b, accessible from fixed 6 (smart TVs, desktop PCs, etc.) and/or mobile 7 (smartphones, tablets, notebook PCs, etc.) electronic devices, provided with Internet connection 8.

With reference to the details of FIG. 3, said system can comprise a single server 4c, adapted to host and execute the streaming platform 5 and the web application 9 simultaneously.

The video cameras 1 are arranged in the fitness centres, or gyms in general, or in structures equipped to host events related to the fitness sector.

The video cameras 1 are associated with Internet connections 3 provided on the video acquisition devices 2 (streamers) connected thereto by means of connection cables of HDMI, USB, firewire type, etc.

The devices 2 are also adapted to encode the videos recorded by the video cameras 1 in video formats manageable by the server 4a and to determine the simultaneous transfer thereof toward said server 4a, by means of the Internet connections 3 arranged on the same.

The streaming platform 5, residing and executed on the server 4a, comprises software libraries and/or services adapted to encode the videos received by the video cameras 1 in streaming formats viewable on fixed 6 and/or mobile 7 electronic devices.

In a preferred embodiment, the server 4a can comprise the following basic characteristics:

Linux or Windows environment;
management of high data traffic;
management of large storage space;
management of databases with unlimited users;
management of audio and video streaming, on demand;
management of audio and video streaming, live, deferred live or recorded;
SSL security certificates;
system libraries, etc. . . .

The server 4b is adapted to cooperate in embedded mode with said server 4a.

The web application 9, residing and executed on the server 4b, enables data exchange between said server 4b and fixed 6 and/or mobile 7 electronic devices, connected to it by means of the respective Internet connections 8, and between said server 4b and the streaming platform 5, residing and executed on the server 4a.

The web application 9, analogous to digital delivery platforms such as Apple Store® or Android Play Store©, is adapted to be managed by means of a plurality of interfaces viewable and usable on fixed 6 and/or mobile 7 electronic devices, by means of web browsers or dedicated software applications (apps).

More in detail, as shown in FIGS. 1 and 4-8, the web application 9 enables the management of a reception-desk 10 comprising channels 11, 12, 13 that give access respectively to:

videos of fitness sessions, produced by fitness centres and/or gyms in general;

videos of fitness sessions, 1 on 1 or for small groups of participants, made by individual trainers: in his case the audio-video communication is two-way using the webcam and the microphone of the client's device (PC, tablet or even smartphone) by means of known video-conferencing protocols (e.g. Skype, Google Hangouts, Cisco webex, etc.);

videos of events related to fitness, organized by fitness centres and/or gyms in general, and/or by individual trainers, in any part of the world;

theoretical and/or practical training videos related to fitness.

The reception-desk 10 of the web application 9 can also comprise a window 14 for displaying scenes randomly selected among the videos broadcasted at that time, managed by the server 4a in live streaming mode.

The access channels 11, 12, 13 of the reception-desk 10 of the web application 9 can have:

B2B (Business to Business) offers, comprising videos intended for professional users, such as fitness centres, gyms, trainers, hotels or leisure structures, etc.;

B2C (Business to Client), offers, comprising videos intended for private users, in particular the individual users of fitness centres and/or gyms.

B2B offers will require registration in the system and will be provided against payment, while B2C offers will still require registration in the system but can be provided either against payment or free of charge, open or by means of an access password.

Figure 8:
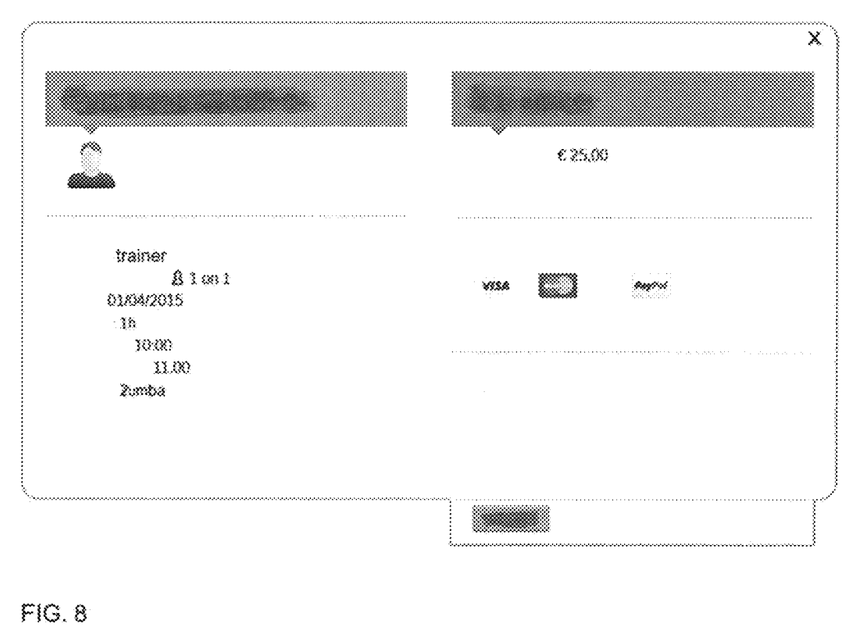

The B2B and/or B2C offers provided against payment can be purchased by accessing sections of the web application 9 adapted to managed transactions on protected connections, executable by means of credit cards, prepaid cards, or electronic payment platforms, similar to the one shown in FIG. 8.

The access channels 11, 12, 13 of the reception-desk 10 of the web application 9 can comprise:
- a list 15 of gyms, trainers, or events, provided with contacts 16 and images 17 representative thereof, and selection buttons 18;
- a button 19, adapted to enable the alphabetical listing of the names 16 present in said list 15;
- a search box 20, adapted to enable the identification of specific names 16 present in said list 15.

The selection buttons 18 are associated with information sheets 21 of the gyms, of the trainers, or of the events present in the lists 15 of the access channels 11, 12, 13 of the reception-desk 10 of the web application 9, which can comprise:
- an archive 22 of videos available for the fitness centres, the trainers, or the events selected;
- a window 23 for displaying said video, provided with buttons 24 for controlling reproduction;
- information 25 concerning the fitness centres (services offered, lists of the trainers available, etc.), the trainers (curriculum, special certificates, etc.), or the events selected (date on which they are taking place, programmes, etc.);
- contact information 26 (addresses, phone numbers, websites, e-mail, etc.) of the fitness centres, of the trainers, or of the events selected;
- a list 27 of feedback concerning the fitness centres, the trainers, or the events selected, or the videos available for the same in the archive 22;
- a form 28 for sending feedback concerning the fitness centres, the trainers, or the events selected, or the videos available for the same in the archive 22;
- buttons 29 for the selective display of the archive 22, of the information 25, of the list of feedback received 27, and of the form 28 for sending the same;
- a timetable 30.

A method for transmitting on demand videos of fitness sessions on fixed and/or mobile electronic devices, according to the invention, substantially comprises the steps of:
- providing at least one video camera 1;
- providing a device 2 for acquisition, encoding and transmission of videos, connectable to said at least one video camera 1, provided with Internet connection 3;
- making a video recording of fitness sessions, by means of said at least one video camera 1;
- transmitting the videos recorded by said at least one video camera 1 toward a first server 4a, by means of the Internet connection 3 associated with said device 2;
- providing a first server 4a adapted to cooperate with said at least one video camera 1 to manage the videos received by means of said Internet connection 3;
- providing a streaming platform 5, residing and executed on said first server 4a, adapted to cooperate with fixed 6 and/or mobile 7 electronic devices, provided with Internet connection 8;
- providing a second server 4b adapted to cooperate with said first server 4a and with fixed 6 and/or mobile 7 electronic devices, provided with Internet connection 8;
- providing a web application 9, residing and executed on said second server 4b, accessible by fixed 6 and/or mobile 7 electronic devices, provided with Internet connection 8;
- accessing said second server 4b, by means of the Internet connection 8 provided on said fixed 6 and/or mobile 7 electronic devices, to send, by means of said web application 9, requests for viewing videos managed by said first server 4a;
- transmitting said viewing requests to the streaming platform;
- 5 of said first server 4a, by means of said second server 4b;
- transmitting the videos corresponding to said viewing requests towards said fixed 6 and/or mobile 7 electronic devices, by means of the streaming platform 5 residing and executed on said first server 4a.

The operating principle of the system for transmitting on demand videos of fitness sessions on fixed and/or mobile electronic devices, forming the subject matter of the present invention is described below.

The video cameras 1 record audio-videos of fitness sessions. The devices 2 connected to the video cameras 1 encode said videos in formats manageable by the server 4a and determine the simultaneous transfer thereof toward said server 4a, by means of the Internet connections 3 provided on the same.

The server 4a receives said videos and provides the server 4b with the data required to add them to the archives 22 of the corresponding information sheets 21 of the web application 9, residing and executed on said server 4b.

The server 4a also provides the server 4b with the data concerning the viewing mode for each video added to the archives 22 of the corresponding information sheets 21 of the web application 9, which can take place in streaming, live or recorded.

By means of partial or total local storage of the videos received, the server 4a can in fact enable deferred live viewing, with a delay of around ten minutes from recording (timeshift function), or recorded viewing of said videos.

The users of the system access the server 4b by means of fixed 6 and/or mobile 7 electronic devices provided with Internet connections 8.

The users of the system choose the fitness centres, the trainers, or the events they are interested in, from the access channels 11, 12, 13 of the reception-desk 10 of the web application 9, executed by server 4b and viewed on the fixed 6 and/or mobile 7 electronic devices connected to it by means of the Internet connections 8.

The choice of the fitness centres, of the trainers, or of the events of interest, can take place as follows:
- making the selection directly from the lists 15 comprised in the access channels 11, 12, 13;
- making the selection from an alphabetic list generated by means of the specific button 19 comprised in the access channels 11, 12, 13;

making the selection from the results of a search carried out by means of the search box 20 comprised in the access channels 11, 12, 13.

The selection of the fitness centres, of the trainers, or of the events of interest, directly from the lists 15 of the access channels 11, 12, 13 is facilitated by names 16 and images 17 representative of the same, and made possible by selection buttons 18.

In the remaining cases the selection of the fitness centres, of the trainers, or of the events of interest, takes place by means of connections to the information sheets 21 of the same.

Regardless of the selection method used, the selection of the fitness centres, of the trainers, or of the events of interest determines the display of the related information sheets 21 on the fixed 6 and/or mobile 7 electronic devices, connected to the server 4b by means of the respective Internet connections 8.

Inside said information sheets 21, the users of the system can:

consult an archive 22 of videos available for the fitness centres, the trainers, or the events selected;
select videos from said archive 22;
view the videos selected, by means of a display window 23 provided with buttons 24 for controlling reproduction;
consult information 25 concerning the fitness centres (services offered, list of trainers available, etc.), the trainers (curriculum, special certificates, etc.), or the events selected (dates on which they are taking place, programmes, etc.);
consult contact information 26 (addresses, phone numbers, websites, e-mail, etc.) of the fitness centres, of the trainers, or of the events selected;
consult a list 27 of feedback concerning the fitness centres, the trainers, or the events selected, or the videos available for the same in the archive 22;
fill out a form 28 for sending feedback concerning the fitness centres, the trainers, or the events selected, or the videos available for the same in the archive 22;
consult information concerning the times of the videos selected (date on which the session or event was recorded, availability of subsequent videos, etc.), by means of a timetable 30.

Specific buttons 29 enable the selective display of the archive 22, the information 25, the list 27 of feedback received, and the form 28 for sending the same, in the information sheets 21 of the fitness centres, of the trainers, or of the events selected.

The server 4b receives from the web application 9 the data concerning the videos selected from the archives 22 present in the aforesaid information sheets 21, and the data concerning the type of fixed 6 and/or mobile 7 electronic devices used for the selection of the same, and retransmits these data to the server 4a.

As a function of the data received by the server 4b, the streaming platform 5 transmits on demand, in streaming, live or recorded, the videos selected toward the recipient fixed 6 and/or mobile 7 electronic devices, connected to said server 4b by means of the respective Internet connections 8.

As a function of the data received by the server 4b, the streaming platform 5 also encodes the videos selected in optimized streaming formats for the recipient fixed 6 and/or mobile 7 electronic devices, so as to facilitate the transmission by means of the respective Internet connections 8 and to ensure the consequent optimal display thereof on the same.

In case of videos provided against payment, the users of the system can purchase the same by accessing a specific section of the web application 9, adapted to manage transactions on protected connections, executable by means of credit cards, prepaid cards, electronic payment platforms, etc.

Users of the system can therefore watch and/or take part in videos of fitness sessions, recorded in the respective places in which they are held, by the video cameras 1, and viewed on demand in the domestic or working environment, from the streaming platform 5, on their own fixed 6 (smart TVs, desktop PCs, etc.) and/or mobile 7 (smartphones, tablets, notebook PCs, etc.) electronic devices.

In equivalent embodiments of the invention, the video recording device by means of video camera 1 and the device 2 for acquisition, encoding and transmission of videos can be integrated and their functions performed by a single device.

In this case the method of transmission of live stream and of video on demand takes place by means of IT devices on which a dedicated tool is installed (an actual broadcaster). This tool is capable of:

capturing a video stream from any video camera connected to the same device (integrated therein or connected by cable, Bluetooth, Wi-Fi, etc . . . ),
processing this stream on the same device, i.e. it is capable of preparing the most suitable video format for the various players available on the market (therefore, these videos can be used in Win, Linux, Apple, Android environments, etc . . . ). No requests are made to third party servers to decide the format of the video to be generated;
locally recording the live stream in various formats (.flv, .mp4, .mkv, .mov, .ts, .m3u8);
if an Internet connection is not present during live recording, the tool saves the video locally and will upload it as soon as it receives the Wi-Fi signal;
sending all the videos saved to a remote server;
interfacing with the most popular streaming platforms (such as YouTube, Twitch . . . ) or with proprietary streaming platforms by means of URLs, Stream Keys and authentication systems.

The various users who want to participate in a live lesson or request a video on demand, can connect by means of any device connected to the Internet to a specific website or use one of the dedicated apps and, by means of dedicated player, connect directly to the device that is transmitting, which will send the video in the most suitable format.

The invention claimed is:

1. A method for transmitting on demand audio-videos of fitness sessions to recipient fixed electronic devices and/or mobile electronic devices provided with an Internet connections (8), said method comprising the following steps:

at different locations in the world, providing at least one video camera (1) that encodes in a first format;
using said at least one video camera (1) to make audio-video recordings of fitness sessions, the audio-video recordings being in the first format;
providing a first server (4a) adapted to receive audio-video recordings over the Internet, the audio-video recordings being recorded independently of each other at the different locations of the world;
providing an acquisition device (2) for acquisition, encoding and transmission of said audio-video recordings, the acquisition device (2) connectable to each said at least one video camera (1) for simultaneously acquiring said audio-video recordings in the first format over the Internet from the different locations of the world, the acquisition device (2) being provided with Internet connection (3), the acquisition device (2) encoding the audio-video recordings acquired in the first format into a second format manageable by the first server (4a);

simultaneously transmitting to the first server (4a), using said Internet connection (3) of the acquisition device (2), the audio-video recordings recorded by each said at least one video camera (1) from the different locations of the world, said acquisition device (2) encoding each of the audio-video recordings into said second format manageable by the first server (4a), wherein the first server (4a) is adapted to cooperate with said at least one video camera (1) to manage the audio-video recordings received over said Internet connection (3) associated with said acquisition device (2);

providing a streaming platform (5), residing and executed on said first server (4a), in order to cooperate with the recipient said fixed electronic devices (6) and/or said mobile electronic devices (7), the streaming platform (5) comprising software libraries and/or services that encode the received audio-video recordings into streaming formats viewable on said fixed electronic devices (6) and/or said mobile electronic devices (7);

providing a second server (4b) adapted to cooperate with said first server (4a) and with said fixed electronic devices (6) and/or said mobile electronic devices (7);

providing a web application (9), residing and executed on said second server (4b), accessible from said fixed electronic devices (6) and/or said mobile electronic devices (7), the web application (9) providing the audio-video recordings simultaneously on different channels that allow a user, remote from the first and second servers, to select a respective one of the audio-video recordings;

said first server (4a) providing said second server (4b) with data of the received audio-video recordings residing on said first server (4a), the second server (4b) using the data to add the received audio-video recordings residing on said first server (4a) to archives (22) of corresponding information sheets (21) of the web application (9), the archives (22) of corresponding information sheets (21) residing and executed on said second server (4b);

a step of said first server (4a) providing said second server (4b) with further data concerning a viewing mode for each of the received audio-video recordings residing on said first server (4a) to be added to the archives (22) of the corresponding information sheets (21) of the web application (9), the viewing modes including streaming in live mode and streaming in recorded mode, the recorded mode providing a timeshift function;

accessing said second server (4b), by means of the Internet connection (8) provided on said fixed electronic devices (6) and/or said mobile electronic devices (7), to send, by means of said web application (9), viewing requests for viewing selected audio-video recordings from the audio-video recordings managed by and residing on said first server (4a), wherein said viewing requests sent by said web application (9) on the second server (4b) include i) data concerning the selected audio-video recordings selected from the archives (22) present in said information sheets (21), and ii) additional data concerning a type of fixed electronic devices (6) and/or said mobile electronic devices (7) used for making the viewing requests;

a step of said second server (4b) receiving the viewing requests via the web application (9), and retransmitting said viewing requests to the streaming platform (5) of said first server (4a); and a step of using the streaming platform (5) residing and executed on said first server (4a) for transmitting the selected audio-video recordings corresponding to said viewing requests toward said fixed electronic devices (6) and/or said mobile electronic devices (7), said transmission of the selected audio-video recordings being as a function of the data in the viewing requests retransmitted by said second server (4b), so as to ensure consequent display of the selected audio-video recordings on the recipient said fixed electronic devices (6) and/or said mobile electronic devices (7) in the most suitable audio-video format for said fixed electronic devices (6) and/or said mobile electronic devices (7) and without any requests being made to a third server to decide the most suitable audio-video format for said fixed electronic devices (6) and/or said mobile electronic devices (7), wherein the web application (9), residing and executed on said second server (4b), presents the audio-video recordings to said fixed electronic devices (6) and/or said mobile electronic devices (7), the audio-video recordings simultaneously being on the different channels that allow each respective user of said fixed electronic devices (6) and/or said mobile electronic devices (7) to select a respective one of the audio-video recordings, the selected audio-video recordings being provided in different audio-formats, each of the different audio-formats being the most suitable audio-video format for each respective one of said fixed electronic devices (6) and/or said mobile electronic devices (7).

2. The method according to claim 1, further comprising the step of providing a server (4c) adapted to integrate the functions of said first server (4a) and of said second server (4b).

3. A system for transmitting on-demand audio-videos of fitness sessions to recipient fixed electronic devices and/or mobile electronic devices provided with an Internet connection (8), the system comprising:

at different locations in the world, at least one video camera (1) that encodes audio-video recordings in a first format;

a first server (4a) connected to the Internet;

an acquisition device (2) for acquisition, encoding and transmission of the audio-video recordings, the acquisition device (2) connectable to said at least one video camera (1) to receive the audio-video recordings, the audio-video recordings being recorded independently of each other at the different locations of the world, the acquisition device (2) being provided with an Internet connection (3), the acquisition device (2) encoding the audio-video recordings acquired in the first format into a second format manageable by the first server (4a);

wherein the first server (4a) is adapted to simultaneously receive the audio-video recordings in the second format, over the Internet from the different locations of the world, from the acquisition device (2) and manage the received audio-video recordings;

a streaming platform (5), residing and executed on said first server (4a), the streaming platform (5) comprising software libraries and/or services adapted to encode the audio-video recordings received in the second format into streaming formats viewable on the fixed electronic devices (6) and/or the mobile electronic devices (7), in order to cooperate with said fixed electronic devices (6) and/or said mobile electronic devices (7);
a second server (4b), associated with said first server (4a); and
a web application (9), residing and executed on said second server (4b), accessible from said fixed electronic devices (6) and/or said mobile electronic devices (7), the web application (9) providing the audio-video recordings simultaneously on different channels that allow a user, remote from the first and second servers, to select a respective one of the audio-video recordings;
wherein said first server (4a) is adapted to cooperate with said at least one video camera (1) to manage the audio-video recordings received by said Internet connection (3) associated with said acquisition device (2),
wherein said first server (4a) is adapted to provide said second server (4b) with data of the received audio-video recordings residing on said first server (4a), the second server (4b) using the received data to add the received audio-video recordings residing on said first server (4a) to archives (22) of corresponding information sheets (21) of the web application (9),
the archives (22) of corresponding information sheets (21) residing and executed on said second server (4b),
wherein said first server (4a) is also adapted to provide said second server (4b) the data concerning the viewing mode for each of the audio-video recordings added to the archives (22) of the corresponding information sheets (21) of the web application (9), the viewing modes including streaming in live mode and streaming in recorded mode, the recorded mode providing a timeshift function; and
wherein said second server (4b) cooperates with said streaming platform (5) of said first server (4a) to enable the on-demand transmission of said audio-video recordings toward said fixed electronic devices (6) and/or said mobile electronic devices (7) connected to said first server (4a) by means of the Internet connections (8) provided on the said first server (4a), said on-demand transmissions being according to a type of said fixed electronic devices (6) and/or said mobile electronic devices (7) used for the selection of said audio-video recordings, so as to ensure the consequent display thereof on said fixed electronic devices (6) and/or said mobile electronic devices (7) in the most suitable audio-video format for said fixed electronic devices (6) and/or said mobile electronic devices (7) and without any requests being made to a third server to decide the most suitable audio-video format for said fixed electronic devices (6) and/or said mobile electronic devices (7),
wherein the web application (9) presents the audio-video recordings to said fixed electronic devices (6) and/or said mobile electronic devices (7), the audio-video recordings simultaneously being on the different channels that allow each respective user of said fixed electronic devices (6) and/or said mobile electronic devices (7) to select a respective one of the audio-video recordings, the selected audio-video recordings being provided in different audio-formats, each of the different audio-formats being the most suitable audio-video format for each respective one of said fixed electronic devices (6) and/or said mobile electronic devices (7).

4. The system according to claim 3, further comprising a server (4c) adapted to integrate in a single device said first server (4a) and said second server (4b) to host and execute the streaming platform (5) and the web application (9).

5. The system according to claim 3, wherein the web application (9) comprises a reception-desk (10) comprising the channels (11, 12, 13) that give access respectively to:
audio-video recordings of fitness sessions, produced at different time or simultaneously by different fitness centres and/or gyms at the different locations in the world;
audio-video recordings of fitness sessions, made by individual trainers;
audio-video recordings of events related to fitness;
theoretical and/or practical training audio-video recordings related to fitness.

6. The system according to claim 5, wherein said reception-desk (10) comprises a window (14) for displaying scenes randomly selected among the audio-video recordings broadcasted alone or simultaneously at that time and managed by the server (4a).

7. The system according to claim 5, wherein said access channels (11, 12, 13) of said reception-desk (10) comprise:
a list (15) of gyms, trainers, or events, provided with contacts (16) and images (17) representative thereof, and selection buttons (18);
a button (19), adapted to enable the alphabetical listing of the names (16) present in said list (15); and
a search box (20), adapted to enable the identification of specific names (16) present in said list (15).

8. The system according to claim 5, wherein said selection buttons (18) are associated with information sheets (21) comprising:
an archive (22) of audio-video recordings of fitness sessions;
a window (23) for displaying said audio-video recordings, provided with buttons (24) for controlling reproduction;
information (25) concerning fitness centres, trainers, or events related to fitness;
contact information (26) of fitness centres, trainers, or events related to fitness;
a list (27) of feedback concerning fitness centres, trainers, or events related to fitness, or audio-video recordings thereof available in the archive (22);
a form (28) for sending feedback concerning fitness centres, trainers, or events related to fitness, or audio-video recordings thereof available in the archive (22);
buttons (29) for the selective display of the archive (22), the information (25), the list (27) of feedback received, and the form (28) for sending the same; and
a timetable (30).

9. A system for transmitting on-demand audio-video recordings of fitness sessions to recipient fixed mobile electronic and mobile electronic devices provided with an Internet connections (8), said system comprising:
a video camera (1) that encodes audio-video recordings of fitness sessions;
a first server (4a) connected to the Internet;
an acquisition device (2) connected to the Internet and connecting to the video camera (1), the acquisition devices adapted to acquire the audio-video recordings in the first format from the video camera, the acquisition device (2) encoding the audio-video recordings acquired into a format manageable by the first server (4a), the acquisition device (2) adapted to transmit to the first server (4a), via Internet, the audio-video recordings encoded by said acquisition device (2) into said format manageable by the first server (4a), wherein the first server (4a) is adapted to manage the audio-video recordings received from said acquisition device (2);

a streaming platform (5) that cooperates with the recipient said fixed electronic devices (6) and said mobile electronic devices (7), the streaming platform (5) comprising software libraries and/or services that encode the received audio-video recordings into streaming formats viewable on said fixed electronic devices (6) and/or said mobile electronic devices (7), the streaming platform (5) residing and executed on said first server (4a);

a second server (4b) operatively connected with said first server (4a) and with said fixed electronic devices (6) and said mobile electronic devices (7);

a web application (9) residing and executed on said second server (4b), the web application (9) being accessible from said fixed electronic devices (6) and/or said mobile electronic devices (7), said first server (4a) provides said second server (4b) with data of the received video recordings residing on said first server (4a), the second server (4b) uses the data to add the received audio-video recordings residing on said first server (4a) to archives (22) of corresponding information sheets (21) of the web application (9), the archives (22) of corresponding information sheets (21) reside on and are executed on said second server (4b);

said first server (4a) provides said second server (4b) with further data concerning a viewing mode for each of the received audio-video recordings residing on said first server (4a) to be added to the archives (22) of the corresponding information sheets (21) of the web application (9), the viewing modes including streaming in live mode and streaming in recorded mode;

said second server (4b), by the Internet connection (8) provided on said fixed electronic devices (6) and said mobile electronic devices (7), sends by said web application (9) viewing requests for viewing selected audio-video recordings from the audio-video recordings managed by and residing on said first server (4a), wherein said viewing requests sent by said web application (9) on the second server (4b) include:

i) data concerning the selected audio-video recordings selected from the archives (22) present in said information sheets (21), and ii) additional data concerning a type of fixed electronic devices (6) and/or said mobile electronic devices (7) used for making the viewing requests, said second server (4b) receives the viewing requests via the web application (9), and retransmits said viewing requests to the streaming platform (5) of said first server (4a), the streaming platform (5) residing and executed on said first server (4a) is adapted for transmitting the selected audio-video recordings corresponding to said viewing requests to said fixed electronic devices (6) and said mobile electronic devices (7), said transmission of the selected audio-video recordings being as a function of the data in the viewing requests retransmitted by said second server (4b), so as to ensure consequent display of the selected audio-video recordings on the recipient said fixed electronic devices (6) and/or said mobile electronic devices (7).

10. The system of claim 9, wherein the streaming platform (5), residing and executed on said first server (4a), is adapted for transmitting the selected audio-video recordings corresponding to said viewing requests to said fixed electronic devices (6) and said mobile electronic devices (7), said transmission of the selected audio-video recordings being as the function of the data in the viewing requests retransmitted by said second server (4b), and without any requests being made to a third server to decide a most suitable audio-video format for said fixed electronic devices (6) and said mobile electronic devices (7), so as to ensure consequent display of the selected audio-video recordings on the recipient said fixed electronic devices (6) and said mobile electronic devices (7).

11. The system of claim 9, wherein the streaming platform (5), residing and executed on said first server (4a), is adapted for transmitting the selected audio-video recordings corresponding to said viewing requests to said fixed electronic devices (6) and said mobile electronic devices (7), said transmission of the selected audio-video recordings being as the function of the data in the audio-video requests retransmitted by said second server (4b), and without any requests being made to a third server to decide a suitable audio-video format for said fixed electronic devices (6) and said mobile electronic devices (7), so as to ensure consequent display of the selected audio-video recordings on the recipient said fixed electronic devices (6) and said mobile electronic devices (7).

* * * * *